United States Patent
Vincelli, Sr.

(10) Patent No.: US 8,163,192 B2
(45) Date of Patent: Apr. 24, 2012

(54) HYDROSEED SUBSTRATE AND METHOD OF MAKING SUCH

(76) Inventor: Fred Vincelli, Sr., Clearwater Beach, FL (US)

( * ) Notice: Subject to any disclaimer, the term of this patent is extended or adjusted under 35 U.S.C. 154(b) by 0 days.

(21) Appl. No.: 12/492,273

(22) Filed: Jun. 26, 2009

(65) Prior Publication Data

US 2010/0326340 A1 Dec. 30, 2010

(51) Int. Cl.
- *A01G 9/08* (2006.01)
- *A01G 9/10* (2006.01)
- *A01G 17/08* (2006.01)
- *C05F 11/00* (2006.01)
- *C09K 3/00* (2006.01)

(52) U.S. Cl. .............. 252/1; 71/23; 71/903; 47/1.01 R; 47/902; 47/DIG. 9; 47/DIG. 10; 111/200; 111/900

(58) Field of Classification Search .............. 71/903, 71/23, 11, 1; 252/182.12, 182.11, 1; 47/1.01 R, 47/902, DIG. 9, DIG. 10; 111/200, 900, 111/902, 906, 915, 130

See application file for complete search history.

(56) References Cited

U.S. PATENT DOCUMENTS

| | | | |
|---|---|---|---|
| 5,290,894 A * | 3/1994 | Melrose et al. | 526/315 |
| 6,740,342 B1 * | 5/2004 | Hulst et al. | 424/725 |
| 2005/0170734 A1 * | 8/2005 | Yang et al. | 442/415 |
| 2005/0192365 A1 * | 9/2005 | Strandburg et al. | 521/50 |
| 2007/0298209 A1 * | 12/2007 | Kohlman et al. | 428/95 |
| 2008/0138248 A1 * | 6/2008 | Viovy et al. | 422/100 |
| 2008/0221247 A1 * | 9/2008 | Sajot et al. | 524/271 |

FOREIGN PATENT DOCUMENTS

DE 102007003649 * 7/2008

* cited by examiner

*Primary Examiner* — Christopher J. Movosad
(74) *Attorney, Agent, or Firm* — Larson & Larson, P.A.; Frank Liebenow; Justin Miller

(57) ABSTRACT

An application for a substrate for mixing with other ingredients such as water, seeds, fertilizer, wetting agents and dye, to produce Hydroseeding slurry. The substrate includes cardboard (e.g. double-line, Kraft fibers), paper (e.g. recycled newsprint) and a material known as diaper fluff that is created during the production of products such as disposable diapers. The diaper fluff improves moisture retention, improves viscosity and reduces friction, improves coverage.

7 Claims, 3 Drawing Sheets

HYDROSEED SUBSTRATE AND METHOD OF MAKING SUCH

FIELD OF THE INVENTION

This invention relates to the field of agriculture and more particularly to a hydroseed substrate and a method of making such.

BACKGROUND

Hydroseeding is well known and consists of mixing seeds, water, and a substrate into a slurry and spreading the slurry over an exposed area of soil. The substrate provides a cover mat to the soil, holding moisture in while reducing sunlight on the soil, thereby preventing weed seeds in the soil from sprouting. Often, fertilizer, minerals, dyes and/or tacking agents, etc, are added to the slurry to improve germination, moisture retention and growth.

Hydroseeding is an improvement over traditional soil preparation and broadcast seeding since it promotes quick germination and provides mulch to reduce soil erosion. Hydroseeding is a lower cost alternative to sod, requiring less preparation, less transportation costs, lower material costs, less labor and faster deployment.

Hydroseeding is also referred to as hydraulic mulch seeding, hydro-mulching or hydra-seeding, and is performed by pressurizing a tank of slurry and spraying the slurry evenly over the exposed soil. Hydroseeding is usually performed using a truck specifically designed for Hydroseeding and the truck usually has a tank, air compressor for pressurizing the tank, a hose to transport the slurry from the truck and a nozzle that forms a spray of slurry under an operator control. Given such a device, a single operator is capable of seeding a very large area in a matter of minutes. Hydroseeding has also been performed from low-flying aircraft in areas that are without any road infrastructure such as forests, in particular, after a forest fire. In such, it is anticipated that Hydroseeding is performed without seed (e.g., a slurry of a substrate, minerals, fertilizer and water) to re-grow an area of the forest without introducing non-native plant species.

Hydroseeding is also used to seed areas with other plant seeds such as wildflower seeds or combinations of grass seed and other plant seeds.

When introduced in the early 1950s, shredded and ground newspaper was often used as the substrate. Later, more advanced substrate formulas were deployed including components such as paper, wood fibers and polymers. For example, U.S. Pat. No. 6,158,167 to Spittle describes mulch flakes made from finely divided paper and/or wood with added surfactants. This patent claims that, once sprayed on the ground, these flakes reduce water run-off and soil erosion.

Current substrates typically are made from grinding wood fiber (100%) or a mixture of wood fiber and newspaper (e.g., 70% wood fiber and 30% newspaper) and adding dye and surfactants.

What is needed is a substrate that will improve water absorbency while maintaining a homogenous viscosity of the slurry.

SUMMARY OF THE INVENTION

The present invention includes a substrate for mixing with other ingredients such as water, seeds, fertilizer, wetting agents, dye, to produce Hydroseeding slurry. The substrate includes cardboard (e.g. double-line, Kraft fibers) and/or paper (e.g. recycled newspaper) along with a material known as diaper fluff. The diaper fluff improves moisture retention, improves viscosity and reduces friction, improves coverage.

In one embodiment, a Hydroseeding substrate is disclosed including up to 99 percent by weight ground cardboard, up to 99 percent ground paper and at least 1 percent and less than 10 percent of ground diaper fluff.

In another embodiment, a method of making a Hydroseed slurry is disclosed including providing diaper fluff, cardboard and paper and grinding the cardboard and paper into a substrate then adding the diaper fluff to the substrate. The substrate is then mixed with water and seed to form a slurry.

In another embodiment, method of Hydroseeding is disclosed including providing diaper fluff, cardboard and paper then grinding the cardboard and paper into a substrate. Next, the diaper fluff is added to the substrate. Next, the substrate is mixed in a Hydroseed mixer with, water and seed into a slurry. The slurry is pumped through a nozzle and sprayed on soil where the seed is to grow.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
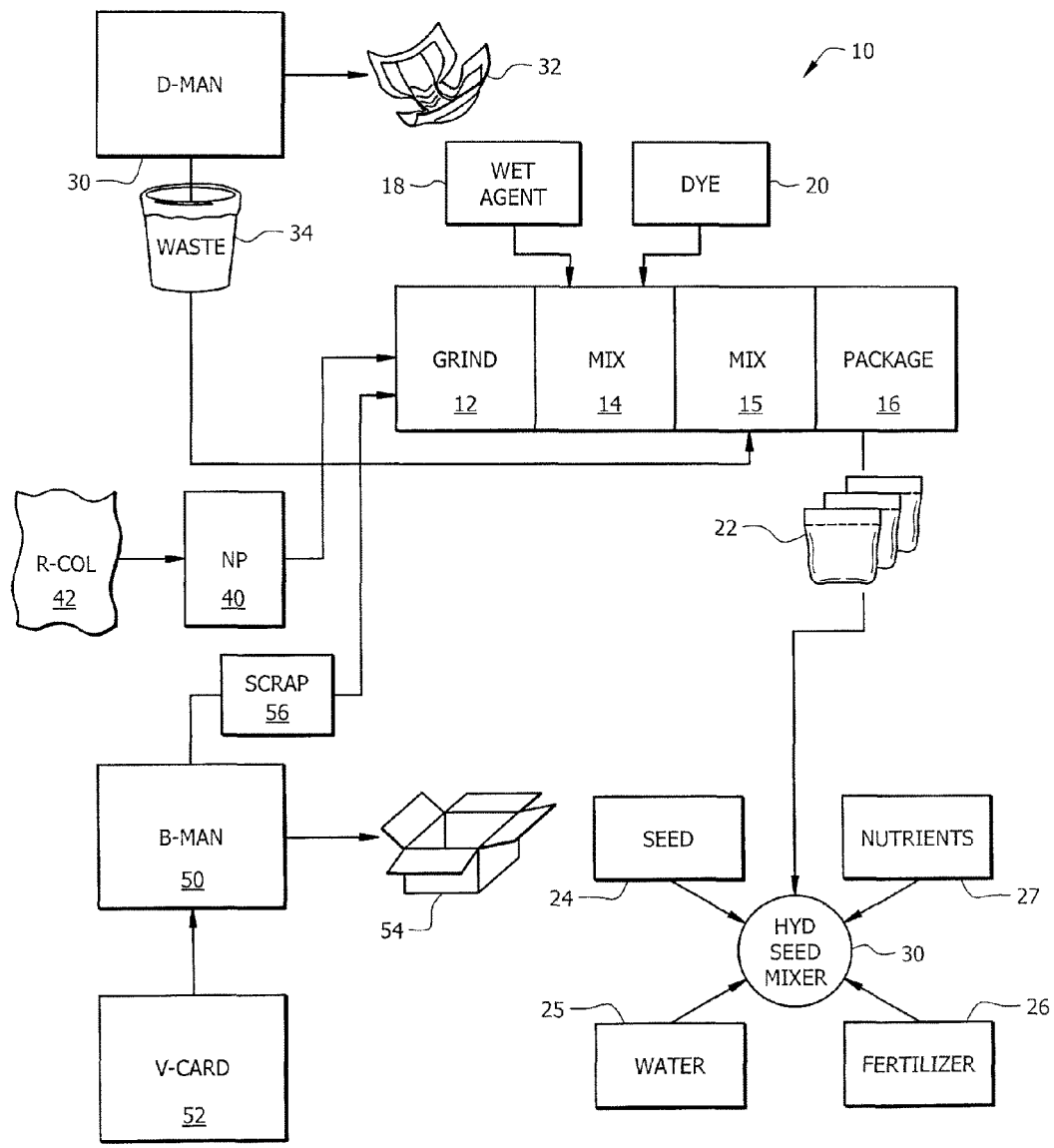
FIG. 1 illustrates a schematic view of a system of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view of a system of the present invention is shown. Diaper fluff is a waste byproduct of disposable diaper production 30. During the production of disposable diapers 30, fibrous diaper material is cut, trimmed and shaped, producing disposable diapers 32, as known in the industry. The trimmings become waste 34, known as diaper fluff 34. Diaper fluff, by design, is highly absorbent. Disposable diapers 32 need to absorb and/or coagulate liquids (urine) and, therefore, diaper fluff 34 is an excellent source of a material that absorbs and/or coagulates liquids (e.g. water). The absorbency of diapers 32 and diaper fluff 34 is enhanced by several materials included in the diaper fluff 34 such as cellulose pulp, polyacrylamide ($—CH_2CHCONH_2—$), polymers, superabsorbent polymers, copolymers of acrylamide $C_3H_5NO$, polymers, etc. Superabsorbent polymers are polymers that can absorb and retain large amounts of a liquid relative to their own mass or weight.

Diaper fluff 34 is an excellent source of these materials that provide absorbency and/or coagulation characteristics to the products included in the present invention. It has been determined that addition of this diaper fluff 34 to hydroseed substrate greatly improves the viscosity of the slurry (when mixed with water and other ingredients) and the slurry holds and retains more moisture, thereby improving germination and seed growth. It is anticipated that diaper fluff 34 is available as from other sources other than diaper production waste. Prior to the disclosed method and composition, the waste/diaper fluff 34 went into landfills.

It is also anticipated that diaper fluff 34 be obtained from the production of other similar, highly absorbent products such as personal hygiene products.

In parallel, paper (e.g. virgin paper, recycled newspaper, newsprint, etc) is collected 42 creating a stock of paper 40. In the past, much of the recycled paper 40 was used to create new paper, but there is a limit to the percentage of recycled paper that is used in paper production due to the breakdown of fibers. The present invention utilizes any paper 40.

Also in parallel, cardboard box manufacturers 50 accept virgin cardboard 52 and produce cardboard boxes 54. Since the virgin cardboard 52 starts as sheets or rectangular sections, it is often trimmed, punched or cut, often producing virgin cardboard scrap 56. In the past, the virgin cardboard scrap 56 was sent to pulping mills or wound up in landfills. The present invention utilizes any cardboard 56, although virgin cardboard 56 is preferred.

The present invention combines amounts newspaper 40 and virgin cardboard scrap 56 that is ground 12, then, once ground to the proper consistency, mixed 14 with any optional ingredients such as wetting agents 18 and dyes 20 which are often added in liquid form. Next, the diaper fluff 34 is mixed 15 into the material to complete the substrate and then packaged 16. For example, the resulting substrate 22 is packaged in bales similar to bales in which peat moss is often delivered. It is preferred that the diaper fluff 34 be added after any liquid components 18/20 are thoroughly mixed and absorbed into the cardboard 56 and/or paper 40 so the diaper fluff 34 doesn't react with and/or begin to absorb the liquids 18/20.

The resulting substrate 22 is later (prior to application) mixed with other ingredients in a hydroseed mixer 30 (e.g., a truck designed for Hydroseeding). In this, other desired ingredients such as water 25, nutrients 27, seeds 24 and fertilizer 26 are added to the substrate 22 forming the slurry that is then sprayed on the area to be seeded.

The addition of diaper fluff 34 provides for greater water absorption above that of the prior use of cardboard and/or paper. The resulting slurry 30 holds more moisture, thereby increasing germination. Furthermore, the resulting slurry is more homogenous, having a more consistent viscosity, thereby reducing settling in the slurry tank of the spreading vehicle and providing a more even application. The diaper fluff 34 also reduces friction of the slurry, making it more slippery, thereby creating fewer clogs in spray equipment and nozzles. It is anticipated that such provides for a greater coverage area to sprayers. Furthermore, once applied to soil, the coagulation properties of the diaper fluff 34 improves the slurry's ability to reduce erosion, especially on hills or where run-off is possible.

The present invention includes a mixture of virgin cardboard 56, paper 40 that are ground together with, diaper fluff 34 to produce the substrate. Optional dyes and surfactants are added to the ground cardboard 56 and paper 40 before introduction of the diaper fluff 34 to permit absorption of the dye and/or surfactant since these are often and preferably in liquid form. The ratio of materials is very important to the resulting substrate 22 and, eventually, the slurry. If too much diaper fluff 34 is added, the resulting slurry will coagulate and not be usable for Hydroseeding. The ideal combination of ingredients is around 70% cardboard 56, 26% paper 40 and 4% diaper fluff 34. It has been found that virgin cardboard 56 works best, although it is anticipated that recycled cardboard is used in some embodiments of the present invention. Although recycled paper 40 works well, it is anticipated that any paper 40 is used in some embodiments of the present invention.

As an example, a preferred formula includes 35 lb of cardboard 56, 13 lb of paper 40 and 2 lb of diaper fluff 34. It is anticipated that a small amount of plastic liner is included in the diaper fluff 34 and such is not detrimental to the resulting substrate 22 and eventual slurry.

In other embodiments, between 1% and 10% diaper fluff 34 is used, the remaining 90% to 99% of the substrate 22 is made up of a combination of zero to 99% cardboard 56 and zero to 99% paper 40. For example, in one embodiment, the substrate 22 comprises 99% cardboard 56 and 1% diaper fluff 34. In another example, the substrate 22 comprises 96% paper 40 and 4% diaper fluff 34. In another example, the substrate 22 comprises 80% cardboard 40, 16% paper 56 and 4% diaper fluff 34. In another example, the substrate 22 comprises no paper 40, 98% cardboard 56 and 2% diaper fluff 34.

It has been shown that the resulting substrate 22 is capable of absorbing approximately 1700 times its weight in water whereas the prior substrates made of wood fiber or wood fiber and newspaper are estimated to absorb around 1000 to 1200 times their weight in water.

Figure 2:
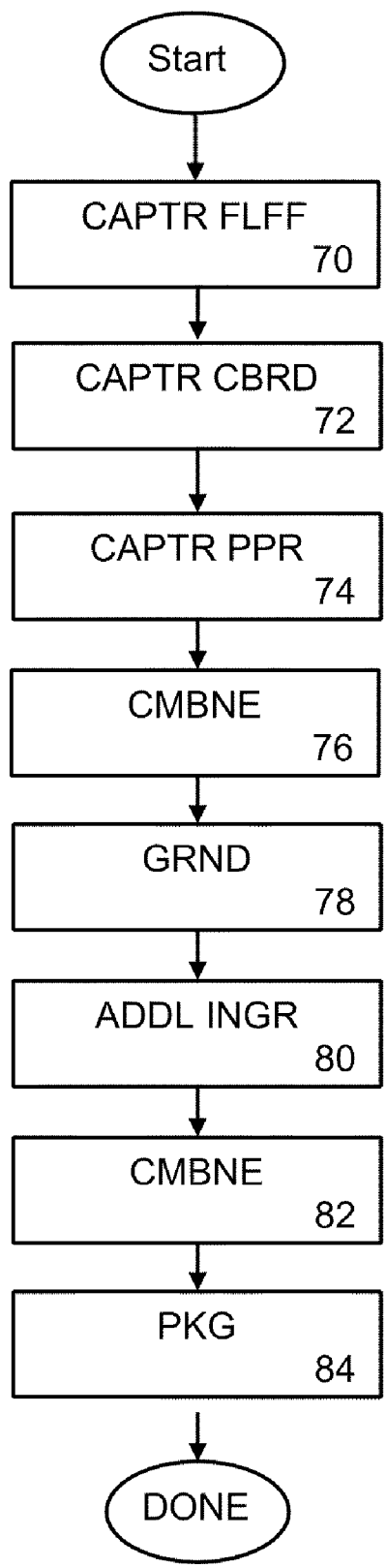
FIG. 2 illustrates a flow chart of the present invention.

Referring now to FIG. 2, a flow chart of the first embodiment of the present invention will be described. The method begins at the diaper manufacturer 30, source of cardboard 50 and source of paper (cellulite paper fibers) 42. At the diaper manufacturer 30, waste 34 (diaper fluff) is collected. At the box manufacturer 50 (recycler, etc), scrap 56 is collected 72. At the paper recycling operation 42 (newspaper recycle, book manufacturer, shredder, etc), paper 40 is collected 74. The appropriate mix of cardboard 56 and paper 40 is combined 76 and ground 78 into the appropriate particle size then any additional ingredients are added 80 such as wetting agents 18 and/or dye 20. Since it is preferred that the wetting agent 18 and/or dye 20 are fluids, the wetting agent 18 and/or dye 20 are absorbed in the cardboard 56 and paper before the diaper fluff 34 is combined/mixed 82. After the diaper fluff 34 is added and mixed 82, the resulting substrate 22 is packaged 84. Although described using sources of cardboard and paper, other sources of cardboard and paper are anticipated.

Figure 3:
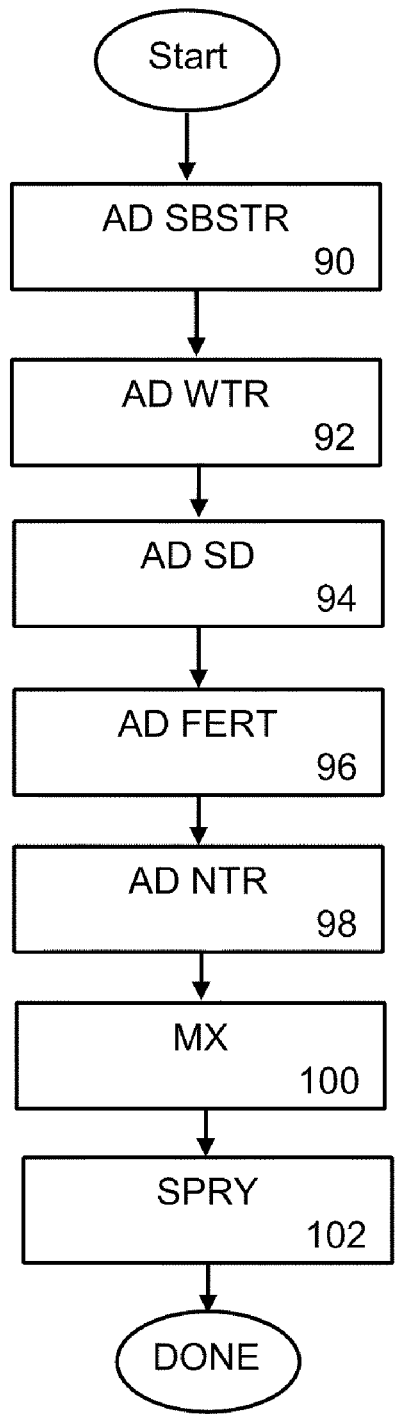
FIG. 3 illustrates a flow chart of deployment of the present invention.

Referring to FIG. 3, a flow chart of deployment of the present invention is shown. Deployment is often performed in a specialized truck or airplane, as known in the industry. The substrate 22 is added 90 to the mixer 30. Water 25 is added 92 and seed 24 is added 94. If needed, fertilizer 26 (e.g., nitrogen) is added 96. If needed, nutrients 27 (e.g., iron) are added 98. The order of adding ingredients is not significant. The substrate 22, water 25, seed 25 and optional fertilizer 26 and nutrients 27 are mixed 100 into the slurry and sprayed 102 on the soil where growth of the seeds is desired.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:
1. A Hydroseeding substrate comprising:
up to 99 percent by weight ground cardboard;
up to 99 percent by weight ground paper; and at least 1 percent by and less than 10 percent by weight of ground diaper fluff, the ground diaper fluff comprising at least one absorbent selected from the group consisting of cellulose pulp, polyacrylamide, polymers, superabsorbent polymers, copolymers of acrylamide, and polymers;

said ground cardboard, said ground paper and said ground diaper fluff combined together and constituting a hydroseed substrate are mixed with water and seed to form a hydroseed slurry.

2. The Hydroseeding substrate of claim 1, wherein the ground cardboard is virgin cardboard.

3. The Hydroseeding substrate of claim 1, wherein the ground cardboard is approximately 70 percent by weight of the slurry, the ground paper is approximately 26 percent by weight of the slurry and the ground diaper fluff is approximately 4 percent by weight of the substrate.

4. The Hydroseeding substrate of claim 1, wherein the substrate comprises approximately 96 percent by weight paper and approximately 4 percent by weight ground diaper fluff.

5. The Hydroseeding substrate of claim 1, wherein the paper is recycled newsprint.

6. The Hydroseeding substrate of claim 1, further comprising a dye.

7. The Hydroseeding substrate of claim 1, further comprising a wetting agent.

* * * * *